US012636674B2

(12) United States Patent
You et al.

(10) Patent No.: US 12,636,674 B2
(45) Date of Patent: May 26, 2026

(54) APPARATUS AND METHOD FOR COATING ELECTRODE

(71) Applicant: LG Energy Solution, Ltd., Seoul (KR)

(72) Inventors: Seongjae You, Daejeon (KR); Taek Soo Lee, Daejeon (KR); Shin Wook Jeon, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 86 days.

(21) Appl. No.: 18/273,688

(22) PCT Filed: Nov. 9, 2022

(86) PCT No.: PCT/KR2022/017550
§ 371 (c)(1),
(2) Date: Jul. 21, 2023

(87) PCT Pub. No.: WO2023/085770
PCT Pub. Date: May 19, 2023

(65) Prior Publication Data
US 2024/0075494 A1      Mar. 7, 2024

(30) Foreign Application Priority Data
Nov. 9, 2021    (KR) ........................ 10-2021-0153050

(51) Int. Cl.
| | |
|---|---|
| *B05C 5/02* | (2006.01) |
| *B01F 25/432* | (2022.01) |
| *H01M 4/04* | (2006.01) |
| *B01F 25/00* | (2022.01) |

(52) U.S. Cl.
CPC ........ *B05C 5/0258* (2013.01); *B01F 25/4323* (2022.01); *H01M 4/0404* (2013.01); *B01F 2025/916* (2022.01)

(58) Field of Classification Search
None
See application file for complete search history.

(56) References Cited

U.S. PATENT DOCUMENTS

| | | | |
|---|---|---|---|
| 2006/0157225 | A1 | 7/2006 | Martin et al. |
| 2008/0102196 | A1 | 5/2008 | Morishima et al. |
| 2008/0305420 | A1 | 12/2008 | Kinoshita et al. |
| 2010/0251815 | A1 | 10/2010 | Schnur et al. |
| 2014/0331923 | A1 | 11/2014 | Kim et al. |
| 2018/0250700 | A1 | 9/2018 | Hirai |

(Continued)

FOREIGN PATENT DOCUMENTS

| | | | |
|---|---|---|---|
| CN | 214261426 U | * | 9/2021 |
| JP | 2001239187 A | | 9/2001 |

(Continued)

OTHER PUBLICATIONS

International Search Report for Application No. PCT/KR2022/017550 mailed Feb. 27, 2023. 3 pages.

(Continued)

*Primary Examiner* — Alexander M Weddle
(74) *Attorney, Agent, or Firm* — Lerner David LLP

(57) ABSTRACT
The present specification relates to an electrode coating apparatus and an electrode coating method that include a turbulent flow generator to uniformize a distribution of a velocity of a coating material transferred from a supply tank to an injection port of a slot die.

3 Claims, 5 Drawing Sheets

(56)                    References Cited

U.S. PATENT DOCUMENTS

| | | |
|---|---|---|
| 2020/0030840 A1 | 1/2020 | Hirai |
| 2020/0297010 A1 | 9/2020 | Savino |

FOREIGN PATENT DOCUMENTS

| | | | | |
|---|---|---|---|---|
| JP | 2004321969 A | 11/2004 | | |
| JP | 2005213732 A | 8/2005 | | |
| JP | 2008-055145 A | 3/2008 | | |
| JP | 2008117541 A | * | 5/2008 | ............ H01M 4/131 |
| JP | 2012128174 A | 7/2012 | | |
| JP | 5021919 B2 | 9/2012 | | |
| JP | 2013-146644 A | 8/2013 | | |
| JP | 5333892 B2 | 11/2013 | | |
| JP | 2015058368 A | 3/2015 | | |
| JP | 2016060044 A | * | 4/2016 | |
| JP | WO2017047449 A1 | 7/2018 | | |
| KR | 20080039286 A | 5/2008 | | |
| KR | 20120117067 A | 10/2012 | | |
| KR | 101212201 B1 | 12/2012 | | |
| KR | 20160147653 A | * | 12/2016 | |
| KR | 101750326 B1 | 6/2017 | | |

OTHER PUBLICATIONS

Extended European Search Report including Written Opinion for
Application No. 22893190.3 dated Sep. 3, 2024. 10 pgs.

* cited by examiner

[FIG. 1]
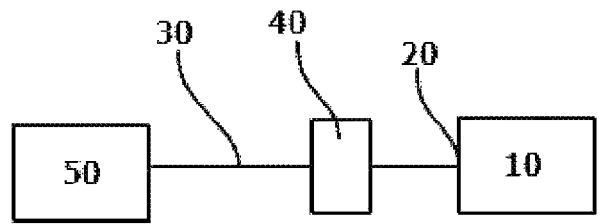
[FIG. 2]
(a)
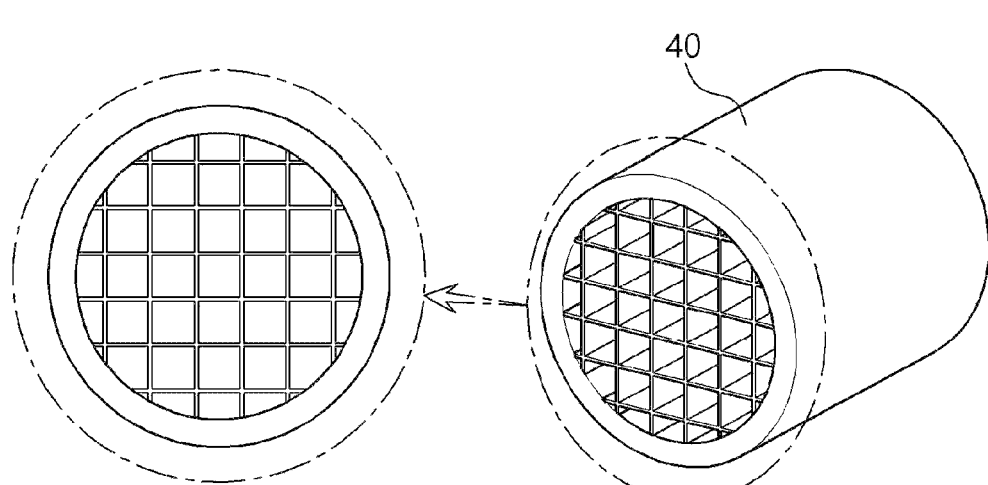
(b)
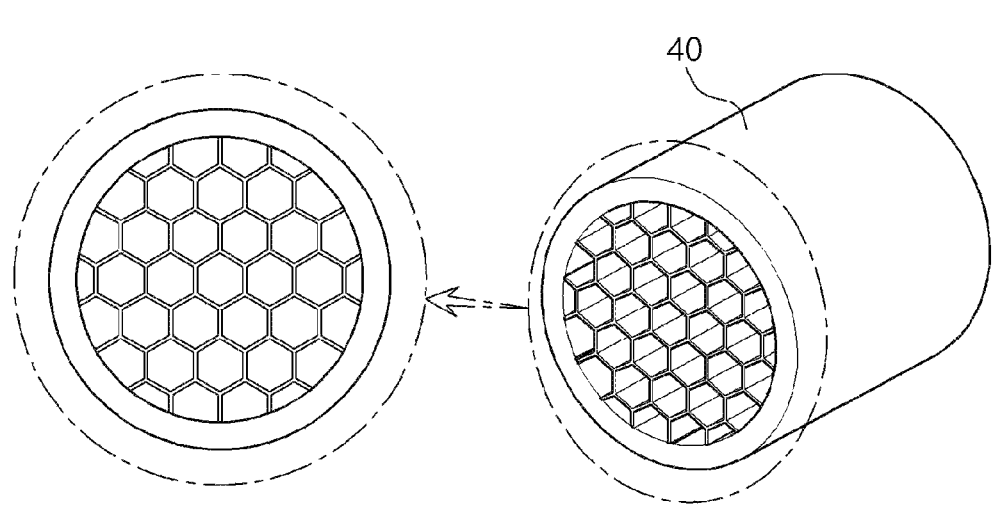

[FIG. 3]
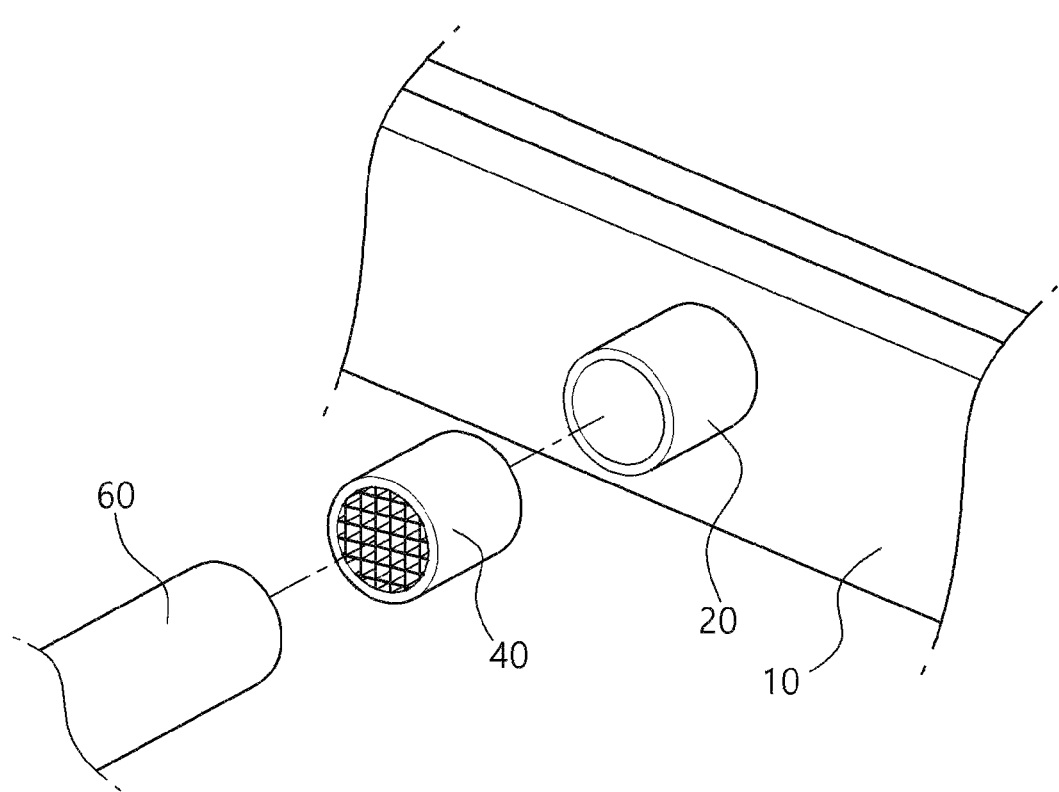

[FIG. 4]
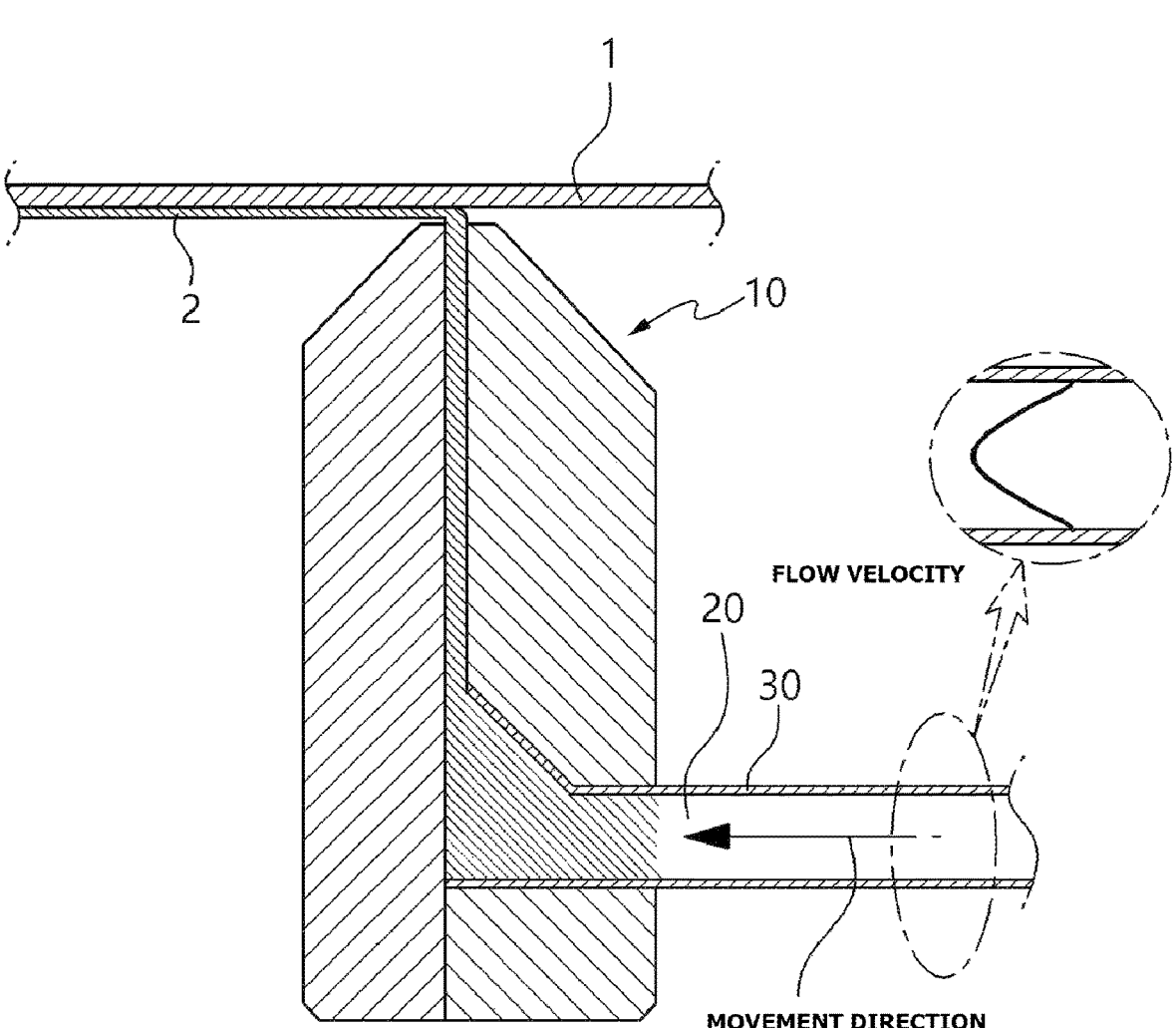

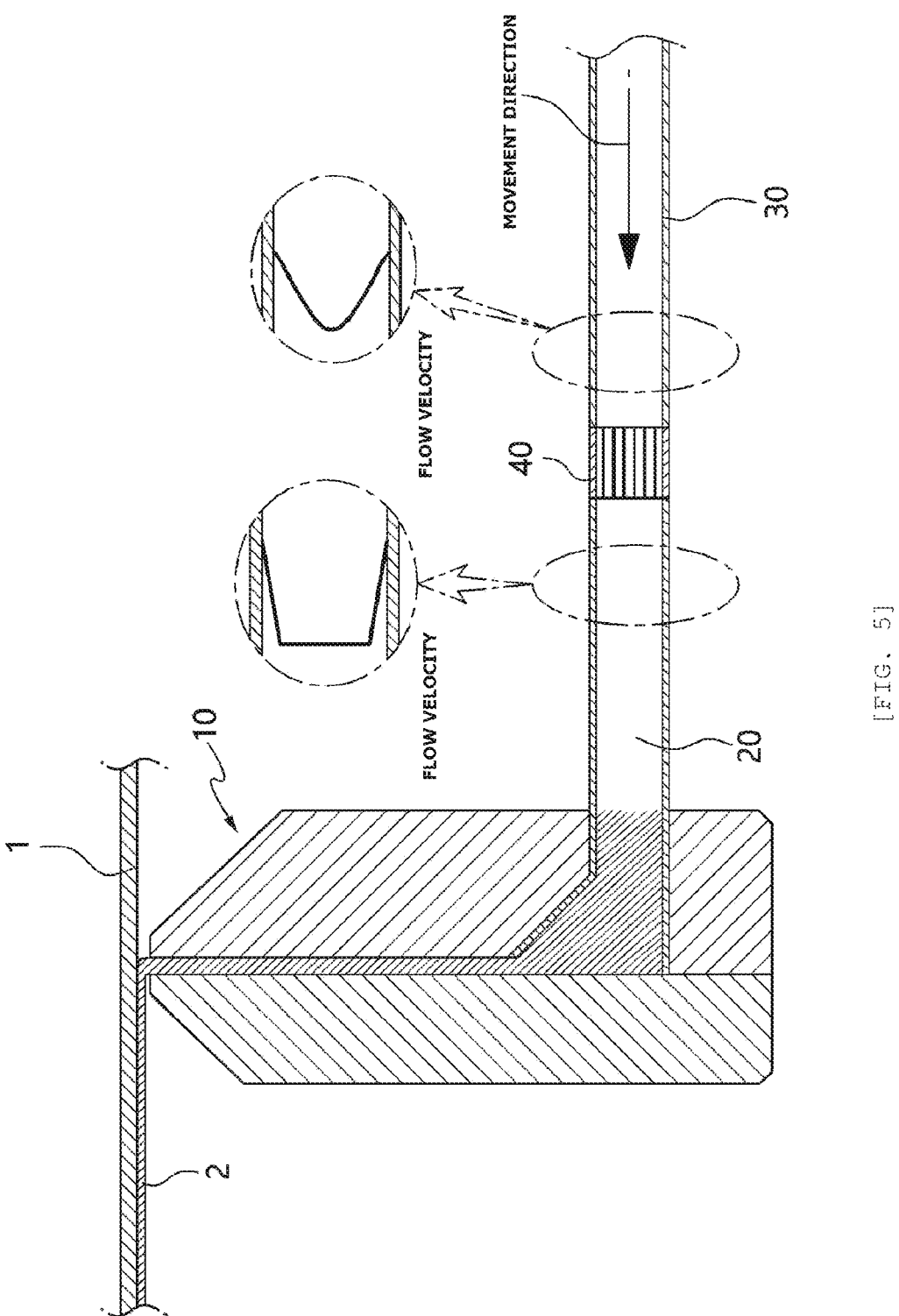
[FIG. 5]

[FIG. 6]
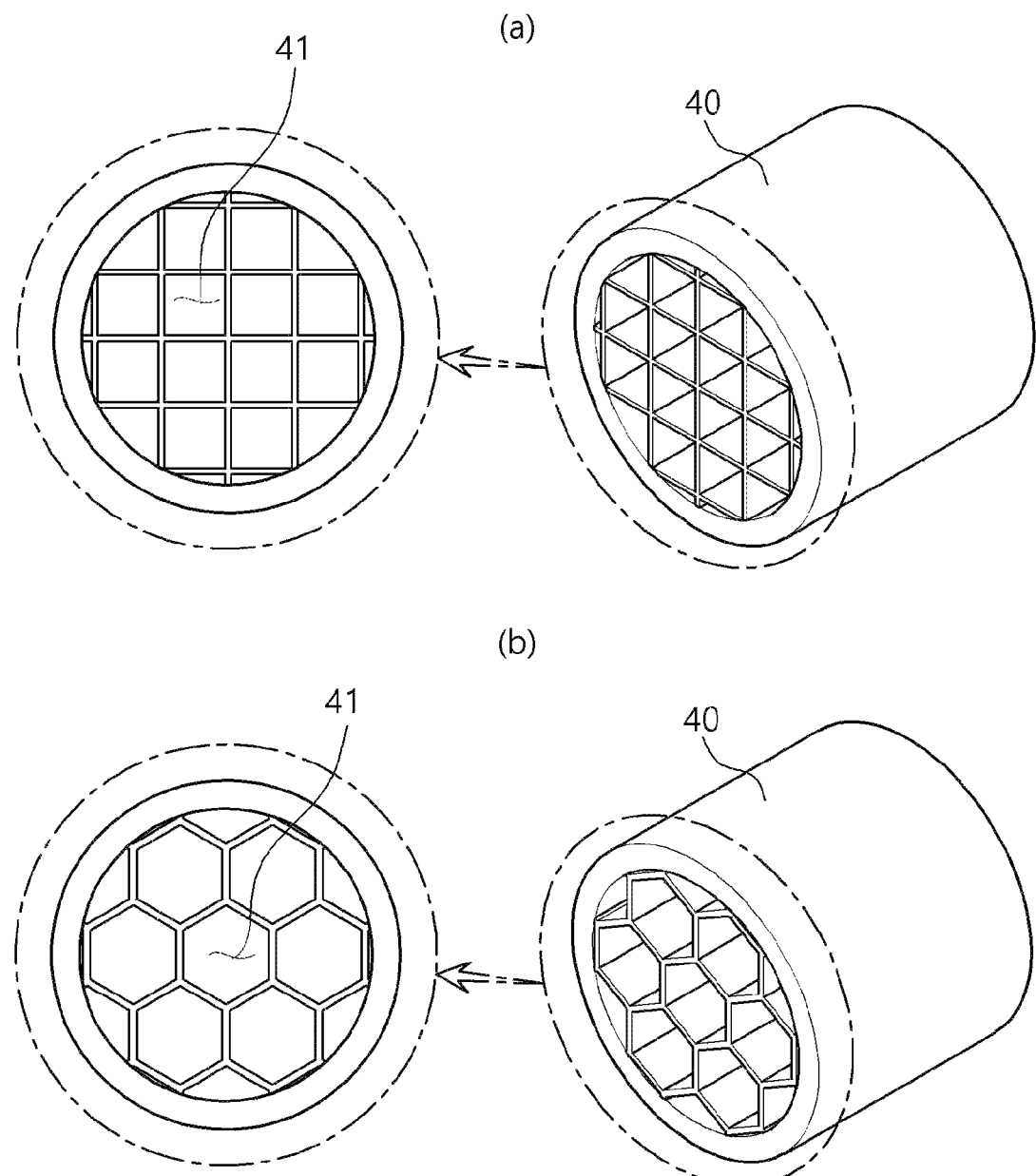

APPARATUS AND METHOD FOR COATING ELECTRODE

CROSS-REFERENCE TO RELATED APPLICATIONS

This application is a national phase entry under 35 U.S.C. § 371 of International Application No. PCT/KR2022/017550, filed on Nov. 9, 2022, which claims priority to Korean Patent Application No. 10-2021-0153050, filed on Nov. 9, 2021, the disclosures of which are hereby incorporated herein by reference in their entireties.

TECHNICAL FIELD

The present specification relates to an electrode coating apparatus and an electrode coating method.

BACKGROUND ART

Recently, prices of energy sources have been raised because of the depletion of fossil fuels, and the interest in environmental pollution is increasing. Therefore, there is an increasing demand for environmental-friendly alternative energy sources. Therefore, research on various power production technologies such as nuclear power, solar power, wind power, and tidal power is being continuously conducted. In addition, interest in power storage devices for more efficiently using the produced energy is high.

In particular, as the development of technologies and demands for mobile devices are increased, there is a rapidly increasing demand for batteries as energy sources. Many studies are being conducted on the batteries in order to meet these needs.

Representatively, regarding a shape of the battery, there is a high demand for an angular or pouch-type secondary battery that may have a small thickness and be applied to products such as mobile phones. Regarding a material, there is a high demand for lithium secondary batteries such as lithium-ion batteries or lithium-ion polymer batteries that have advantages such as a high energy density, a discharge voltage, and output stability.

In general, the secondary battery is structured to include an electrode assembly made by stacking a positive electrode, a negative electrode, and a separator positioned between the positive electrode and the negative electrode. The positive and negative electrodes are each manufactured by applying slurry containing an active material onto a current collector.

Among the methods of coating a slurry containing an active material on a current collector, in the case of a slot die, it is difficult to uniformly apply the coating material due to high pressure at the central portion where the electrode slurry is injected.

Accordingly, there is a need to uniformize a distribution of a velocity of a coating material transferred from a supply tank to an injection port of the slot die.

DETAILED DESCRIPTION OF THE INVENTION

Technical Problem

The present specification is intended to provide an electrode coating apparatus and an electrode coating method.

Technical Solution

One embodiment of the present specification provides an electrode coating apparatus including: a die coater configured to apply electrode slurry onto a substrate; an injection port configured to supply the electrode slurry to the die coater; a flow path having an end coupled to the injection port so that the electrode slurry moves to the die coater; and a turbulent flow generator provided in the flow path and configured to generate a turbulent flow in the electrode slurry moving along the flow path.

Another embodiment of the present specification provides an electrode coating method, which uses a die coater configured to apply electrode slurry onto a substrate, the electrode coating method including: generating a turbulent flow in a flow of the electrode slurry by allowing the electrode slurry to pass through a turbulent flow generator before the electrode slurry is injected into the die coater; injecting the electrode slurry, which has passed through the turbulent flow generator, into the die coater; and applying, by the die coater, the electrode slurry onto the substrate.

Advantageous Effects

According to the electrode coating apparatus and the electrode coating method according to the embodiment of the present specification, it is possible to uniformize the distribution of the velocity of the coating material transferred from the supply tank to the injection port of the slot die.

According to the electrode coating apparatus and the electrode coating method according to the embodiment of the present specification, it is possible to reduce the width direction deviation of the coating material transferred from the supply tank to the injection port of the slot die.

BRIEF DESCRIPTION OF DRAWINGS

FIG. 1 is a schematic view illustrating an electrode coating apparatus.

FIG. 2A is a perspective view and a vertical cross-sectional view illustrating a turbulent flow generator having a mesh pattern according to the embodiment, and FIG. 2B is a perspective view and a vertical cross-sectional view illustrating a turbulent flow generator having a honeycomb structure according to another embodiment.

FIG. 3 is an exploded perspective view illustrating the electrode coating apparatus.

FIG. 4 is a cross-sectional view of an electrode coating apparatus in the related art, illustrating a path through which electrode slurry moves to a tip of the slot die and a flow velocity in a flow path.

FIG. 5 is a cross-sectional view of the electrode coating apparatus according to the embodiment, illustrating a path through which electrode slurry moves to a tip of the slot die and a change in flow velocity in a flow path caused by the turbulent flow generator.

FIG. 6A is a perspective view and a vertical cross-sectional view illustrating a turbulent flow generator having a mesh pattern according to still another embodiment, and FIG. 6B is a perspective view and a vertical cross-sectional view illustrating a turbulent flow generator having a honeycomb structure according to yet another embodiment.

EXPLANATION OF REFERENCE NUMERALS AND SYMBOLS

1: Substrate
2: Electrode slurry
10: Die coater
20: Injection port 30: Flow path
40 Turbulent flow generator
41: Minimum unit
50: Supply tank
60: Supply pipe for electrode slurry
100: Electrode coating apparatus

BEST MODE

Hereinafter, the present invention will be described in detail with reference to the drawings. However, the drawings are intended to illustratively describe the present invention, and the scope of the present invention is not limited by the drawings.

FIG. 1 is a schematic view illustrating an electrode coating apparatus 100. The electrode coating apparatus 100 includes a supply tank 50, a die coater 10, an injection port 20, a flow path 30, and a turbulent flow generator 40. One end of the injection port 20 may be fastened to the electrode slurry flow path 30 through which electrode slurry moves from the supply tank 50. By such fastening, a flow path 30 through which the electrode slurry moves from the supply tank 50 to the die coater 10 is formed, and a turbulent flow generator 40 is provided in the flow path 30. FIG. 3 is an exploded perspective view illustrating the electrode coating apparatus 100. As illustrated in FIG. 3, the injection port 20 is a pipe protruding from a lateral surface of the die coater. One end of the turbulent flow generator 40 is fastened to an end of the pipe, and the other end of the turbulent flow generator 40 is fastened to an end of a supply pipe 60 for the electrode slurry. The flow path 30 may be a path through which the electrode slurry moved from the supply pipe for the electrode slurry passes through the turbulent flow generator and is injected into the pipe.

FIG. 2A is a perspective view and a vertical cross-sectional view illustrating the turbulent flow generator having a mesh pattern according to the embodiment, and FIG. 2B is a perspective view and a vertical cross-sectional view illustrating a turbulent flow generator having a honeycomb structure according to another embodiment.

The turbulent flow generator 40 is provided in the flow path 30. The turbulent flow generator 40 may be mounted as a module integrated with the flow path 30. Alternatively, the turbulent flow generator 40 may be mounted as a replaceable module and separable from the flow path 30. In particular, in case that the turbulent flow generator 40 is mounted as a replaceable module, the turbulent flow generator 40 is conveniently installed and easily replaced and maintained. In contrast, in case that the turbulent flow generator 40 is positioned in the die coater 10, there is an inconvenience of having to disassemble and separate the die coater 10 or replacing the die coater 10 to replace the turbulent flow generator 40 in the die coater 10.

The turbulent flow generator 40 generates a turbulent flow in the electrode slurry moving along the flow path 30. The turbulent flow generator 40 may have a shape selected to minimize a pressure drop caused by an additional structure in the flow path 30. The use of a shape, which blocks fluidity in the flow path 30, i.e., the use of a plate, which is not parallel to a flow direction, is not preferable. Specifically, the turbulent flow generator 40 may uniformize a distribution of the velocity while minimizing a pressure drop as long as the turbulent flow generator 40 may form a turbulent flow that is separated by an additional structure. The structure constituting the turbulent flow generator 40 is provided in the form of a thin metal yarn or a plate parallel to the flow direction to uniformize the distribution of the velocity while minimizing the pressure drop, such that the moving electrode slurry 2 is affected by the edge of the plate, that is, the thickness of the plate, and the flow is divided, reducing the velocity deviation.

As illustrated in a cross-sectional view of an electrode coating apparatus in the related art in FIG. 4, it can be ascertained that a deviation between a flow velocity at a wall side of the flow path and a flow velocity at a central portion increases as the electrode slurry 2 moves to the tip of the slot die. In case that the deviation between the flow velocities is large as described above, the pressure at the central portion increases, and the electrode slurry 2 is not equally applied onto the substrate 1.

In contrast, the electrode coating apparatus 100 according to the present specification includes the turbulent flow generator 40 to uniformize the distribution of the velocity of the coating material transferred to an injection port 20 of the slot die. Specifically, as illustrated in FIG. 5, when the electrode slurry 2 passes through the turbulent flow generator while moving to the tip of the slot die, a turbulent flow reduces a deviation between the flow velocities, and the electrode slurry 2 with the uniformized distribution of the velocity is more equally applied.

A cross-section of the turbulent flow generator 40 may have a pattern having a plurality of polygons disposed adjacent to one another in a direction perpendicular to a longitudinal direction of the flow path. The polygon in the pattern, which has the plurality of polygons disposed adjacent to one another, is a figure having three or more vertices in a plan view. Specifically, the polygon may have three to ten vertices. For example, the polygon may be a triangle, a quadrangle, a pentagon, a hexagon, or the like.

The turbulent flow generator 40 may include a plate for defining the polygon or include a metal yarn for defining the polygon.

The plate may be a metal plate. The material of the plate is not particularly limited as long as the plate may maintain sufficient strength for maintaining a shape of the plate without affecting the electrode slurry or being affected by the electrode slurry. The material of the plate may be stainless steel such as SUS304. A thickness of the plate is not particularly limited as long as the plate may maintain sufficient strength for maintaining a shape of the plate. For example, a thickness of the plate may be 0.1 mm or more and 10 mm or less.

The material of the metal yarn is not particularly limited as long as the metal yarn may maintain sufficient strength for maintaining a shape of the metal yarn without affecting the electrode slurry or being affected by the electrode slurry. The material of the metal yarn may be stainless steel such as SUS304. A thickness of the metal yarn, i.e., a diameter of a vertical cross-section of the metal yarn in a longitudinal direction is not particularly limited as long as the metal yarn may maintain sufficient strength for maintaining a shape of the metal yarn. For example, a thickness of the metal yarn may be 0.1 mm or more and 10 mm or less.

As illustrated in FIG. 2, a cross-section of the turbulent flow generator 40 may have a mesh pattern or honeycomb structure in a direction perpendicular to the longitudinal direction of the flow path.

As illustrated in FIG. 2A, a cross-section of the turbulent flow generator 40 has a mesh pattern in the direction perpendicular to the longitudinal direction of the flow path 30. In this case, in case that a density of the mesh pattern is too high, i.e., in case that a quadrangular area of a minimum unit 41 is too small, a pressure drop increases. Therefore, a density of the mesh pattern may be low. The quadrangular area of the minimum unit 41 of the mesh pattern may be 3% or more, 4% or more, 5% or more, 6% or more, 7% or more, 8% or more, 9% or more, or 10% or more, and 20% or less, and specifically, 10% or more and 20% or less of an overall area of the cross-section of the flow path 30. In case that the above-mentioned range is satisfied, it is possible to uniformize the flow velocity by means of the turbulent flow generator while minimizing the pressure drop. In the cross-section of the flow path 30 in the longitudinal direction, the number of minimum units 41, i.e., the number of quadrangles is ten or less. In this case, the number of minimum units is the number of closed figures that maintains the repeated quadrangular shapes.

As illustrated in FIG. 6A, in the cross-section of the flow path 30 in the longitudinal direction, the number of minimum units 41, i.e., the number of quadrangles may be ten. In this case, the number of minimum units is the number of closed figures that maintains the repeated quadrangular shapes.

As illustrated in FIG. 2B, the cross-section of the turbulent flow generator 40 has a honeycomb structure in a direction perpendicular to the longitudinal direction of the flow path. In this case, in case that a density of the honeycomb structure is too high, i.e., an area of the hexagon of the minimum unit 41 is too small, a pressure drop increases. Therefore, a density of the honeycomb structure may be low. Specifically, an area of the hexagon of the minimum unit 41 of the honeycomb structure may be 3% or more, 4% or more, 5% or more, 6% or more, 7% or more, 8% or more, 9% or more, or 10% or more, and 20% or less, and specifically, 10% or more and 20% or less of the overall area of the cross-section of the flow path 30. In case that the above-mentioned range is satisfied, it is possible to uniformize the flow velocity by means of the turbulent flow generator 40 while minimizing the pressure drop. In the cross-section of the flow path 30 in the longitudinal direction, the number of minimum units 41, i.e., the number of hexagons is ten or less. In this case, the number of minimum units is the number of closed figures that maintains the repeated hexagonal shapes.

As illustrated in FIG. 6B, in the cross-section of the flow path 30 in the longitudinal direction, the number of minimum units 41, i.e., the number of hexagons may be seven. In this case, the number of minimum units is the number of closed figures that maintains the repeated hexagonal shapes.

The die coater 10 applies the electrode slurry 2 onto the substrate 1. The configuration of the die coater includes a first die, a second die, and a shim provided between the first and second dies and configured to discharge the electrode slurry. The injection port 20 for the electrode slurry penetrates a lateral surface of at least one of the first and second dies. The injection port 20 may be a simple hole or protrude from the lateral surface of the die coater. The injection port 20 may be a pipe that penetrates the lateral surface of at least one of the first and second dies and protrudes from the lateral surface.

One end of the injection port 20 may be fastened to the electrode slurry supply pipe 60 through which the electrode slurry moves from the supply tank 50. By such fastening, a flow path 30 through which the electrode slurry moves from the supply tank 50 to the die coater 10 is formed. In this flow path, a turbulent flow generator 40 may be provided in a pipe protruding from a lateral surface of the die coater or a supply pipe 60 for the electrode slurry.

Another embodiment of the present specification provides an electrode coating method, which uses the die coater 10 configured to apply the electrode slurry 2 onto the substrate 1, the electrode coating method including: generating a turbulent flow in a flow of the electrode slurry by allowing the electrode slurry to pass through the turbulent flow generator 40 before the electrode slurry is injected into the die coater 10; injecting the electrode slurry, which has passed through the turbulent flow generator, into the die coater 10; and applying, by the die coater 10, the electrode slurry 2 onto the substrate 1.

The description of the electrode coating method may be replaced with the description of the electrode coating apparatus.

A person skilled in the art may understand that the present invention may be carried out in other specific forms without changing the technical spirit or the essential characteristics of the present invention. Therefore, it should be understood that the above-described embodiments are illustrative in all aspects and do not limit the present invention. The scope of the present invention is represented by the claims rather than the detailed description, and it should be interpreted that the meaning and scope of the claims and various embodiments derived from the equivalent concepts thereto fall within the scope of the present invention.

The invention claimed is:

1. An electrode coating apparatus comprising:
a die coater configured to apply an electrode slurry onto a substrate;
an injection port configured to receive supply of the electrode slurry therethrough to the die coater;
a flow path having an end coupled to the injection port and configured to receive movement therethrough of the electrode slurry to the die coater; and
a turbulent flow generator provided within the flow path and configured to generate a turbulent flow in the electrode slurry within the flow path,
wherein the turbulent flow generator has a cross-section pattern having a plurality of polygons disposed adjacent to one another in a direction perpendicular to a longitudinal direction of the flow path, the cross-section pattern comprising ten or less closed polygon figures that maintain a repeated polygon shape, and
wherein the turbulent flow generator comprises plates that form the plurality of polygons, the plates extending parallel to the longitudinal direction of the flow path.

2. The electrode coating apparatus of claim 1, wherein the turbulent flow generator has the cross-section pattern having the plurality of polygons that includes a mesh pattern or a honeycomb structure in the direction perpendicular to a longitudinal direction of the flow path.

3. The electrode coating apparatus of claim 1, wherein the injection port is an injection pipe protruding from a lateral surface of the die coater,
wherein a first end of the turbulent flow generator is fastened to an end of the injection pipe, and a second end of the turbulent flow generator is fastened to an end of a supply pipe configured to supply the electrode slurry therefrom, and
wherein the flow path is a path configured to receive movement therethrough of the electrode slurry from the supply pipe, through the turbulent flow generator, and into the injection pipe.

* * * * *